United States Patent
Lingham et al.

(10) Patent No.: US 10,664,923 B2
(45) Date of Patent: May 26, 2020

(54) SYSTEM AND METHOD FOR ESTABLISHING A PUBLIC LEDGER FOR GIFT CARD TRANSACTIONS

(71) Applicant: Gyft, Inc., Redwood City, CA (US)

(72) Inventors: Vinodan K. Lingham, Los Altos, CA (US); Mark Levitt, Foster City, CA (US); Krisan Ramesh Nichani, San Francisco, CA (US); Guillaume P. Lebleu, San Francisco, CA (US)

( * ) Notice: Subject to any disclaimer, the term of this patent is extended or adjusted under 35 U.S.C. 154(b) by 493 days.

(21) Appl. No.: 14/658,097

(22) Filed: Mar. 13, 2015

(65) Prior Publication Data
US 2016/0267605 A1 Sep. 15, 2016

(51) Int. Cl.
| | |
|---|---|
| *G06Q 40/00* | (2012.01) |
| *G06Q 20/00* | (2012.01) |
| *G06Q 20/34* | (2012.01) |
| *G06Q 20/02* | (2012.01) |
| *G06Q 20/28* | (2012.01) |

(52) U.S. Cl.
CPC ............ *G06Q 40/12* (2013.12); *G06Q 20/02* (2013.01); *G06Q 20/28* (2013.01); *G06Q 20/3433* (2013.01)

(58) Field of Classification Search
None
See application file for complete search history.

(56) References Cited

U.S. PATENT DOCUMENTS

| | | | |
|---|---|---|---|
| 2007/0011100 A1* | 1/2007 | Libin | G06F 21/34 705/65 |
| 2008/0052164 A1* | 2/2008 | Abifaker | G06Q 20/10 705/14.27 |
| 2008/0296368 A1* | 12/2008 | Newsom | G06Q 20/28 235/380 |
| 2009/0106826 A1* | 4/2009 | Palestrant | G06F 21/35 726/7 |
| 2009/0182663 A1* | 7/2009 | Hurst | G06Q 20/105 705/41 |
| 2012/0150743 A1* | 6/2012 | Isaacson | G06Q 10/101 705/44 |
| 2012/0197740 A1* | 8/2012 | Grigg | G06Q 20/20 705/16 |
| 2012/0233073 A1 | 9/2012 | Salmon et al. | |

(Continued)

*Primary Examiner* — Scott A Zare
(74) *Attorney, Agent, or Firm* — Eversheds Sutherland (US) LLP

(57) ABSTRACT

Disclosed is a method for providing fraud protection and transaction tracing for gift card accounts through use of a public blockchain ledger. Digital gift cards are associated with tokens which are passed between user accounts. The users do not obtain direct access to the debit codes assigned to the gift cards and are instead provided with variable authentication codes for use in merchant purchases. The variable authentication code is used by a merchant to obtain a reference to an actual debit code held by a web server. Numerous types of transactions are published to the blockchain ledger including initial purchases, reserving/claiming of debit codes, transfers of tokens between accounts, and depleting of gift card value associated with a token. Transactions published to the blockchain occur substantially simultaneously with a merchant purchase such that users may look up gift card values at any time to be assured each gift card is valid.

19 Claims, 7 Drawing Sheets

(56) References Cited

U.S. PATENT DOCUMENTS

| | | |
|---|---|---|
| 2013/0191227 A1 | 7/2013 | Pasa et al. |
| 2014/0214626 A1* | 7/2014 | Bowers .................. G06Q 50/01 |
| | | 705/26.81 |
| 2015/0026072 A1* | 1/2015 | Zhou ................. H04M 1/72522 |
| | | 705/71 |
| 2015/0046337 A1* | 2/2015 | Hu ..................... G06Q 20/0658 |
| | | 705/65 |

* cited by examiner

| Height | Age | Transactions | Amount |
|---|---|---|---|
| 106 | 2 min | 102 | $185 |
| 105 | 12 min | 75 | $5675 |
| 104 | 24 min | 32 | $265 |
| 103 | 34 min | 256 | $2987 |
| 102 | 44 min | 89 | $1245 |
| 101 | 52 min | 137 | $382 |
| 100 | 1 hr 2 min | 332 | $946 |

Enter search ...    GO

| ID | Merchant | Amount |
|---|---|---|
| 01e6qzrtau7946... | Amazon.com | $100 |
| 24g8sdbfjl39845... | Papa John's | $30 |
| 62gsdfqopi4589... | Regal Cinemas | $25 |
| 08o9wtavb9348... | Barnes & Noble | $75 |
| 16e8qprwu9462... | American Eagle | $50 |
| 40h6sbml93854... | Best Buy | $100 |
| 22h9dfopq5387... | Whole Foods Market | $25 |
| 03w4tawbi3564... | The Home Depot | $150 |
| 12b2qrtzua4679... | Target | $75 |
| 42k1bfdbs9754... | iTunes | $40 |
| 02g23f2oq1985... | GameStop | $200 |
| 01o6tbvw8439... | Starbucks | $25 |
| 10g2rqwbu2649... | Zappos | $10 |
| 04p5bswm4583... | Kohl's | $50 |
| 02h4wqmvs3578... | Express | $100 |

*FIG. 1*

SYSTEM AND METHOD FOR ESTABLISHING A PUBLIC LEDGER FOR GIFT CARD TRANSACTIONS

FIELD OF THE INVENTION

The present invention relates to the tracking and recording transfers of digital assets. More specifically, the present invention relates to retaining public records of gift card purchases and transfers.

BACKGROUND OF THE INVENTION

Gift cards are digital assets which have value associated with a single entity. Gift cards are traditionally non-transferable after gifted. One reason for this is transference of gift cards via prior art methods enable increased fraud.

INCORPORATION BY REFERENCE

United States patent U.S. patent application Ser. No. 13/831,365 (Inventors: Levitt, et al.; Filed on Mar. 14, 2013), titled "SYSTEMS AND METHODS FOR DIGITAL GIFT CARD SELECTION" is incorporated by reference in its entirety and for all purposes to the same extent as if the patent application was specifically reprinted in this specification.

SUMMARY OF THE PRESENT INVENTION

Embodiments include a method for tracing expendable debit card ownership. First a server would issue a token, the token represents a given monetary value to a specified merchant, the given monetary value is expendable via reference to a debit code representing a gift card, wherein the debit code is stored on the server. The token is then associated with one of a plurality of accounts, wherein an account is accessible to an account user. Having a token entitles an account to receive periodic variable authentication codes, wherein referencing the most recently issued variable authentication code to the server directs the server to expend a selected amount of the given monetary value at the discretion of the account user using the debit code. The account user would then direct the server to transfer the association of the token from the user's account to a second account. Finally, the server publishes the transfer to a public ledger such as a blockchain as a transfer record.

Embodiments additionally include a method for tracing expendable debit card balance. First a server would issue a token, the token represents a given monetary value to a specified merchant, the given monetary value is expendable via reference to a debit code representing a gift card, wherein the debit code is stored on the server. The token is then associated with one of a plurality of accounts, wherein an account is accessible to an account user. Having a token entitles an account to receive periodic variable authentication codes, wherein referencing the most recently issued variable authentication code to the server directs the server to expend a selected amount of the given monetary value at the discretion of the account user using the debit code. When the user wished to make a purchase with the specified merchant, the account user would direct the server to expend the selected amount of the given monetary value using the debit code at the discretion of the account user establishing a modified monetary amount. Finally, the server publishes the expenditure of the given monetary value and the modified monetary amount to a public ledger such as a blockchain as an expenditure record.

Embodiments further include a method for tracing all gift card transactions. First a server would issue a token, the token represents a given monetary value to a specified merchant, the given monetary value is expendable via reference to a debit code representing a gift card, wherein the debit code is stored on the server. The token is associated with a first account of a plurality of user accounts, wherein an account is accessible to an account user, and the first account having a first account user. Having a token entitles an account to receive periodic variable authentication codes; accordingly, the first account would receive such codes, wherein referencing the most recently issued variable authentication code by the first account user to the server directs the server to expend a selected amount of the given monetary value with the one or more debit codes at the discretion of the first account user. When the first user wished to either transfer some or all of the value associated with the token to either a merchant or another user, the first user would direct the server to transfer the selected amount of the given monetary value using the one or more debit codes at the discretion of the first account user to either the specified merchant or to a second account, thereby establishing a modified monetary amount represented by the token associated with the first account. Finally, the server publishes the expenditure of the given monetary value and the modified monetary amount to a public ledger as an expenditure record.

BRIEF DESCRIPTION OF THE FIGURES

One or more embodiments of the present disclosure are illustrated by way of example and not limitation in the figures of the accompanying drawings, in which like references indicate similar elements.

FIG. 1 illustrates the user interface of a sample blockchain system adapted for gift card use.

DETAILED DESCRIPTION

Figure 2A:
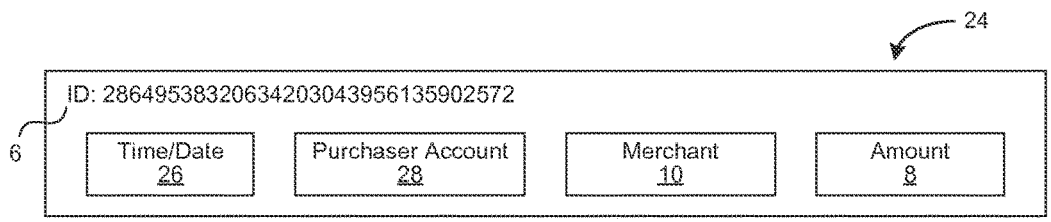
FIG. 2A illustrates a sample transaction record on the blockchain where a user purchases a gift card.

Gift cards in a purely electronic system do not use physical cards. The term, "gift card," is a misnomer, though still used to express a concept. In actual fact gift cards are no more than numerical codes with an associated value to a given corporation or entity. In using a mobile device enhanced gift card system, such as the Gyft mobile application available on iOS or Android, or another operating system of similar character, gift "cards" are displayed to users on their mobile devices, though no actual "card" exists. The displayed card is simply a digital artifact that the application is directed to present to the user. The user's device does not include additional code indicating the presence of the card—rather the evidence of "card" ownership exists merely on the application's host server and the host server directs the mobile application to display the "card" for the user. Reference to a "gift card" in this context merely refers to the concept of reasonably fixed debit with a specified entity. A blockchain is a public ledger. The public ledger includes all such transactions that have ever been executed. The blockchain is constantly growing as 'completed' blocks are added with a new set of recordings. The blocks are added to the blockchain in a linear, chronological order, like a chain.

Referring now to FIG. 1, FIG. 1 is a representation of a blockchain interface 2. The blockchain interface 2 is a web interface that appears to users by use of a web browser such as Microsoft Internet Explorer, Mozilla Firefox, Apple Safari, Google Chrome, or another suitable program known in the art. The blockchain interface 2 will include a transaction stream 4. The transaction stream 4 displays records of transactions on the network and updates actively, in real-time, as users of the network perform transactions. The transaction stream 4 would include a transaction ID 6, the transaction ID 6 could be a hash code, or reference to a token or digital construct. The transaction stream 4 further includes the amount for which the transaction concerns ("amount") 8, and the merchant for which the gift card is with ("merchant") 10. The blockchain interface 2 also includes a block stream 12. The block stream 12 updates in a similar fashion to the transaction stream 4; however the block stream 12 displays data concerning collections of transactions, which are compiled into "blocks." Blocks can be a collection of all transactions in a given period, or they might be sorted differently, such as by merchant 10. Alternatively, blocks could be compiled or by reference to a particular token or other digital construct. The data presented in the block stream 12 includes a block height 14 designation number which grows linearly as blocks are added to the chain, the age 16 of each block, the number of transaction records 18 included in each block, and the block amount 20 which denotes the amount of money transacted in each block. The blockchain interface 2 would additionally include a search bar 22 which a user would use to search for particular transaction records or blocks.

The blockchain interface 2 illustrated in FIG. 1 is merely illustrative. Other elements could be included in the interface such as including the age of a given transaction in the transaction stream 4, sorting blocks by merchant 10, or presenting information in another preferred manner. Further, additional analytical charts could be presented through additional web interface pages. Such analytical charts could include data such as trends concerning how long users of accounts held on to tokens, data concerning specific merchant trends, or other chartable data relevant to gift card transactions.

Referring now to FIGS. 2A, 2B, 2C, and 2D, the 2 series of FIG.s illustrates different kinds of transaction records associated with differing transactions. FIG. 2A is a gift card purchase record 24 which would include a transaction ID 6, a time stamp 26, a purchaser account 28 which identifies who purchased the gift card by a real name, or an account name pseudonym. The gift card purchase record 24 further includes reference to the merchant 10 and the amount 8.

Figure 2B:
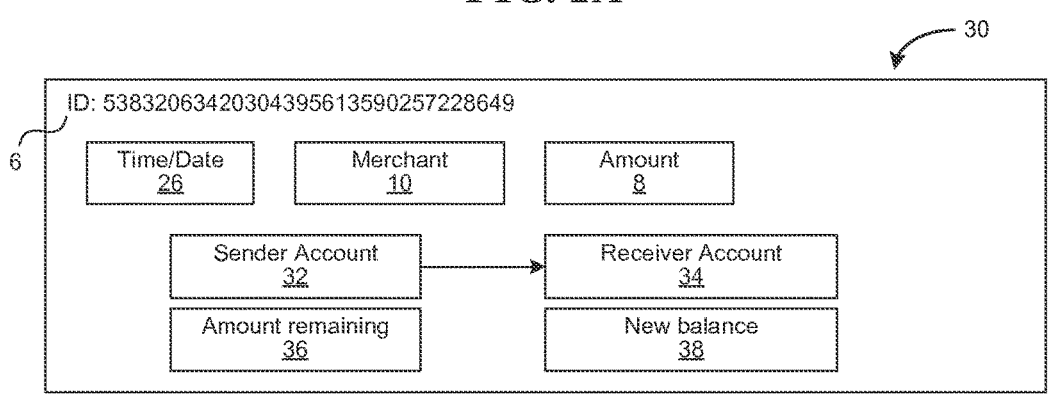
FIG. 2B illustrates a sample transaction record on the blockchain where a user transfers a gift card to another user.

FIG. 2B is a gift card transfer record 30 which would include a transaction ID 6, a time stamp 26, a sender account 32 which identifies the grantor of the gift card by a real name, or an account name pseudonym. Similarly, the gift card transfer record 30 has a receiver account 34 which is identified in the same manner as the sender account 32. Additionally, associated with the sender account 32, the remaining balance 36 on the sender's account will be displayed along with the new balance 38 of the receiver's account. The gift card transfer record 30 further includes reference to the merchant 10 and the amount 8.

Figure 2C:
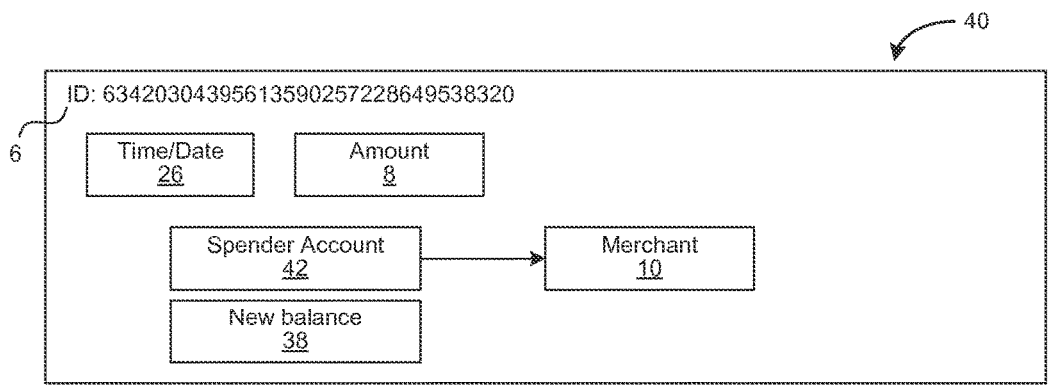
FIG. 2C illustrates a sample transaction record on the blockchain where a user expends gift funds at a specified merchant.

FIG. 2C is a gift card expenditure record 40 which would include a transaction ID 6, a time stamp 26, a spender account 42 which identifies who is expending the funds of the gift card by a real name, or an account name pseudonym. The gift card expenditure record 40 further includes reference to the merchant 10, the amount 8 expended and the new balance 38 of the account.

Figure 2D:
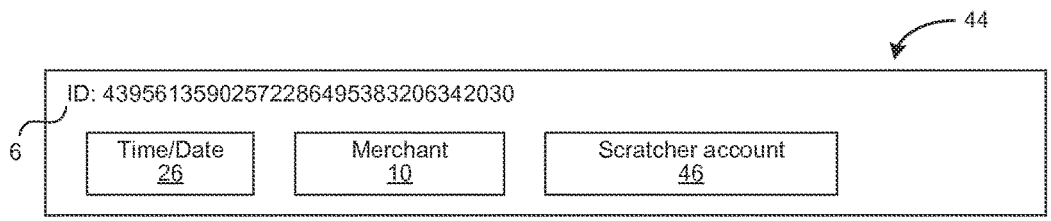
FIG. 2D illustrates a sample transaction record on the blockchain where a user claims gift funds at a specified merchant.

FIG. 2D is a gift card claim record 44 which denotes that a given account wishes to begin receiving authentication codes (discussed below). Gift card claim record 44 would include a transaction ID 6, a time stamp 26, a scratcher account 46 which identifies who claims the gift card by a real name, or an account name pseudonym. The gift card claim record 44 further includes reference to the merchant 10. The transaction records illustrated in the 2 series of FIGs is merely illustrative. Other elements could be included as necessary.

Figure 3:
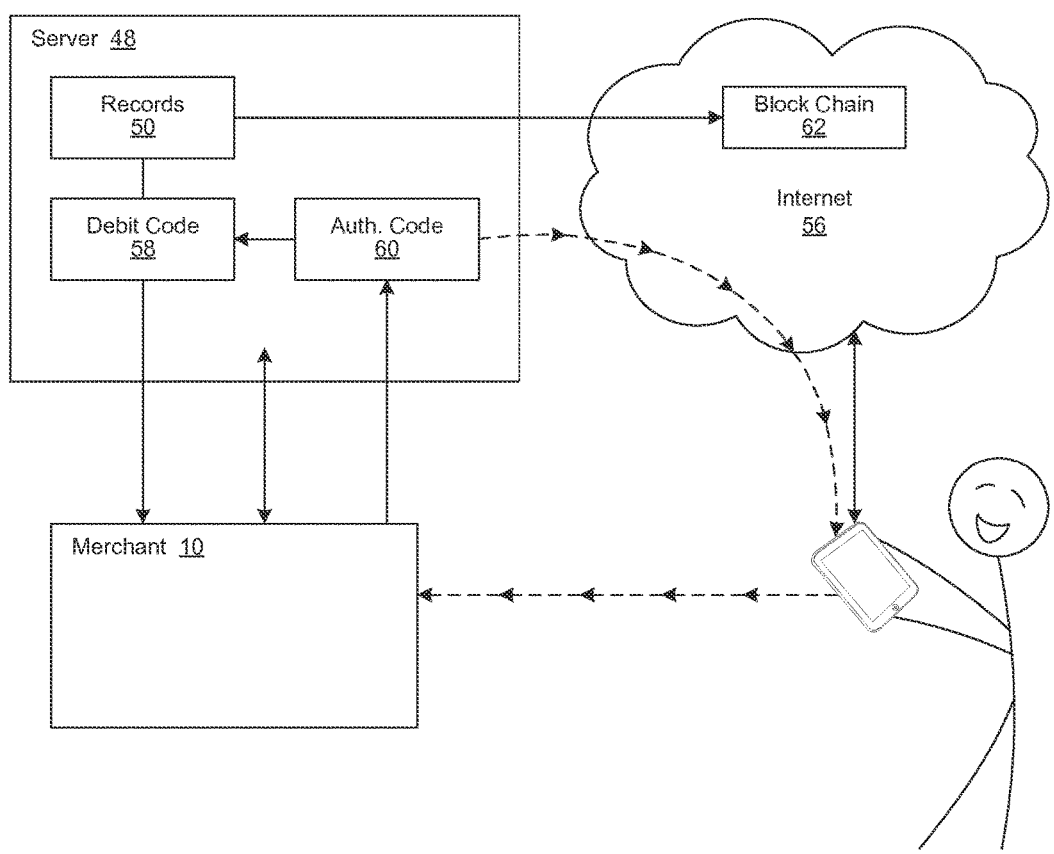
FIG. 3 illustrates communication and data transfer between entities using a mobile-based gift card exchange adapted to a blockchain publisher system.

Referring to FIG. 3, FIG. 3 is illustrates communication and data transfer between entities using a mobile-based gift card exchange adapted to a blockchain publisher system. The system centers around a web server 48. The web server 48 stores business records 50. Customers 52 of the system would use web-enabled devices 54 to contact the server 48 through the Internet 56 and purchase gift cards for a given merchant 10. Web-enabled device 54 would include mobile phones, laptop computers, tablet computers, desktop computers, or another suitable device capable of contacting a web server.

The server 48 acquires a gift card on behalf of the customer 52, from a merchant 10. That debit card is manifested by a debit code 58. The debit codes 58 may be used for the system to work efficiently, it is not necessary for the server 48 to obtain debit codes 58 individually each time a customer 52 orders. A given debit code 58 may cover the orders of multiple customers 52, or inversely, multiple debit codes 58 may cover a single order from a single customer 52. The debit codes 58 on the server 48 may predate an order by a customer 52 or the debit codes 58 may be acquired in response to an order by a customer 52.

Customers 52 would not actually see or have direct access to debit codes 58. Instead, customers 52 see variable authentication codes 60. Customers 52 who have purchased a gift card from the server 48, will have an account stored on the server 48 in server records 50. This account could be represented by a token, or some other digital construct which is associated with the customer's account stored in records 50. As an optional step the system would make use of a "scratching" feature where a customer 52 would indicate to the server 48 that a purchased gift card should be claimed. Before the "scratch" occurred, the server 48 would not have to assign a debit code 58 to the customer 52. Though the records 50 would should that the customer 52 had a debit account of a given monetary value, that account would not have to be assigned a code to enable actually expending the monetary value of the account until the customer 52 scratched, or claimed the gift card. Once a gift card is claimed, the customer 52 receives periodic variable authentication codes 60 through the Internet 56.

Variable authentication codes 60 change on a regular basis, such that no code is usable forever. The lifetime of a variable authentication code 60 could be measured in seconds or minutes. When one variable authentication code 60 "dies," another is issued. Optionally, to reduce purchase failure, the lifetime of variable authentication codes 60 could overlap, such that in a given moment it would be possible that two variable authentication codes 60 would be valid. An alternative model for variable authentication codes 60 issuance would involve simply issuing a variable authentication code 60 with a set lifetime anytime a customer 52 accessed their account on the server 48 while issuing no variable authentication codes 60 while a customer's account remained dormant.

In use, a variable authentication code 60 can be used at a specified merchant 10. The merchant 10 then communicates the variable authentication code 60 supplied by the customer 52 to the server 48. Should the variable authentication code 60 supplied by the customer 52 match the code 60 that is "live" on the server 48, the server 48 will indicate to the merchant 10 one or more debit codes 58 to use to fulfil the customer's 52 order.

Alternatively to expending gift card monetary value at a merchant 10, customers 52 can exchange gift cards with one another. The transaction, along with merchant expenditure transactions would be recorded in records 50, and the records 50 would be published on the internet 56 to a blockchain 62.

Figure 4:
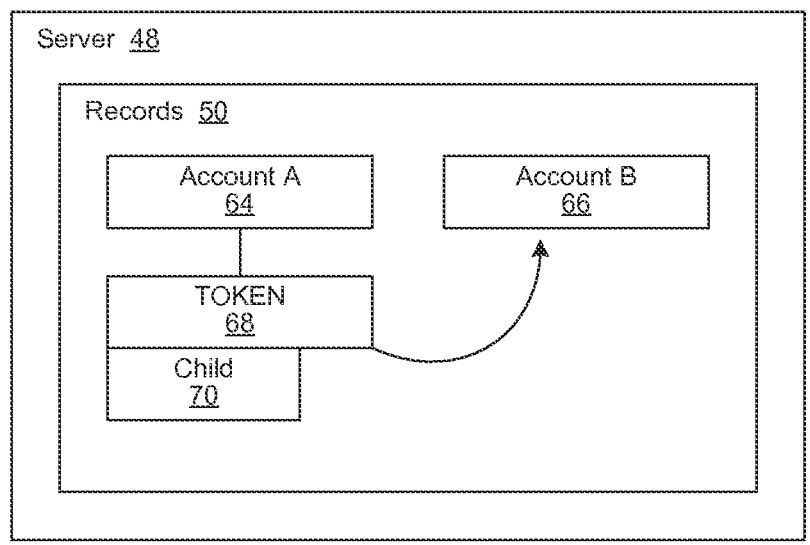
FIG. 4 illustrates a gift card transfer between accounts.

Referring now to FIG. 4, with continued reference to FIG. 3, FIG. 4 illustrates a gift card transfer between accounts. On the server 48, stored in records 50, are user account A 64 and user account B 66. In order to record value on a blockchain 62, a token 68 or some other digital contract would be used. When user account A 64 intends to give a gift card to user account B 66, a token 68 is transferred from user account A 64 to user account B 66. The transfer of the token 68 is published to the blockchain 62. In one embodiment of a token 68, the token 68 is simply an account flag with a unique ID. In a second embodiment of a token 68, the token 68 is a simple record which includes a reference to a single debit code 58 and is used primarily to act as a public reference to the debit code 58 without revealing the debit code 58.

In a third embodiment of a token 68, the token 68 is a dynamic record which serves to keep an accounting of all gift card business conducted by an account. As a dynamic record, the token 68 would keep track of one or more debit codes 58 which are associated with the monetary value owed by a specific merchant to the token holder. Each of these debit codes 58 may be shared over numerous tokens 68. A first token 68a may have 100% interest in a first debit code 58a, and 25% interest in a second debit code 58b, whereas a second token 68b may have the remaining 75% of the interest in the second debit code 58b. Should a user purchase more credit with a given merchant 10, additional debit codes 58 would be added to the token 68. If the token acts as a dynamic record, transferal from user account A 64 to user account B 66 would involve transfer of the entire token 68, or the creation of a child token 70 which contained partial value of the original token 68. A child token 70 would either remain with user account A 64 and the original token 68 would be transferred to user account B 66, or vice-versa.

Figure 5:
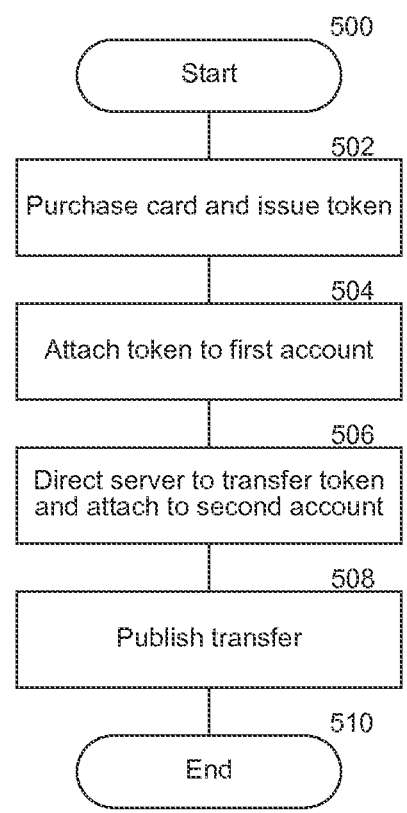
FIG. 5 is a flow chart of a published transfer of a gift card from one user account to a second user account.

Referring now to FIG. 5, FIG. 5 is a flow chart of a published transfer of a gift card from one user account to a second user account. First, a user of the system will purchase a gift card through an online web server, and the web server will issue a representative token for that gift card (502). The web server then attaches the issued token to the user's account (504). Through the user interface, the user would direct the server to transfer the gift card to another user's account—the transfer of the gift card would transfer the representative token between accounts as well (506). Finally, the token transfer of step 506 will be published online to a blockchain ledger (508).

Figure 6:
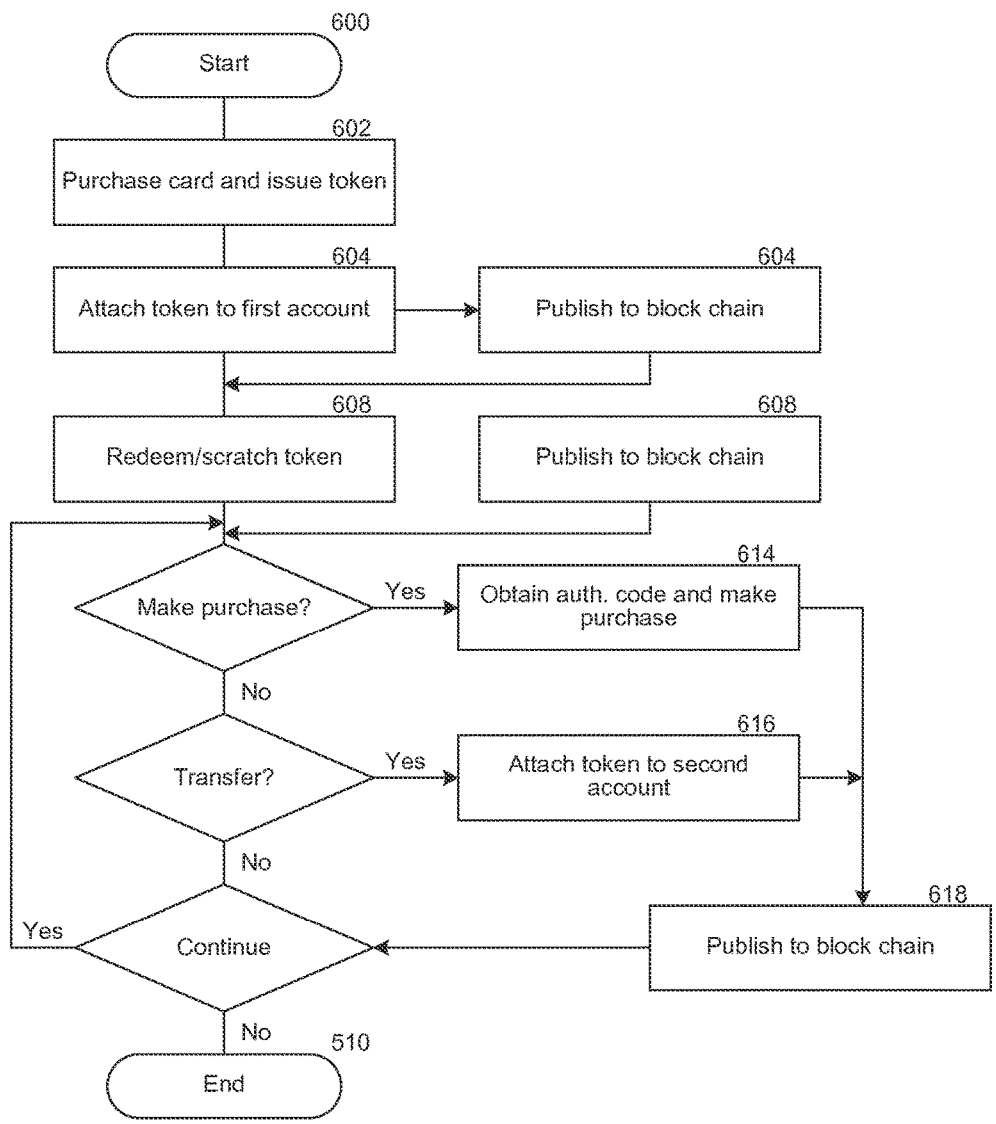
FIG. 6 is a flow chart illustrating the method for publishing numerous types of transactions in a mobile-based gift card exchange.

Referring now to FIG. 6, FIG. 6 is a flow chart illustrating the method for publishing numerous types of transactions in a mobile-based gift card exchange. First, a user of the system will purchase a gift card through an online web server, and the web server will issue a representative token 68 for that gift card (602). The web server then attaches the issued token to the user's account (604). When the token is attached to the user's account the server will publish the token generation to a public blockchain ledger (606). The user will eventually claim the purchased gift card. Claiming or "scratching" the gift card could occur immediately after purchase, or as late as when the user intended to redeem the gift card with the merchant. When the gift card is claimed by the user, the server will assign the user one or more debit codes or part of a debit code (608). The assignment of a debit code would also be published to the public blockchain, though the debit code itself would not be referenced—rather the debit code itself would be kept private by the server (610). Once a debit code is assigned to the token, the user has the option to make purchases. To make a purchase, the server will send the user an authorization code, the code is used at the merchant. The merchant references the authorization code to the server which provides the assigned debit code to the merchant. The merchant charges to the debit code and the server records the transaction with respect to the token (614). A user can also transfer a token to another user. While FIG. 6 displays the transfer query after the claim step, tokens may optionally be transferred between users before the token is claimed. The token simply switches accounts without having an assigned debit code. Regardless of when the transfer occurs, the server records the transfer (616). With either a merchant charge to an assigned debit code, thereby diminishing a token, or a transfer of a token the server will publish this information to the public blockchain (618).

Figure 7:
FIG. 7 is a time flow chart illustrating a sample order of operations for gift card transactions.

Referring now to FIG. 7, FIG. 7 is a time flow chart illustrating a sample order of operations for gift card transactions. The time flow chart includes four columns, each column representing a party to described transactions. Moving down the chart progresses the transactions in time. The space between actions is not standardized for time, and the time between a given action and the subsequent action could be measured anything between milliseconds and years. Some operations on the time chart could be performed in a different order or not at all—this chart is provided merely to present an illustrative example. The content of the chart is self-explanatory.

In certain embodiments, the server would manage an inventory of debit codes for one or more merchants. The inventory would provide a marketplace for gift cards without requiring the merchant's own infrastructure to be operational in order for the sale of gift cards. The inventory would not necessarily require that a given debit code be entirely used by any one customer. Each debit code could be shared amongst a group of customers, or multiple debit codes could serve to fulfill a single gift card purchase. The server would determine which debit codes were expended, thus it is feasible that a given debit code would only remain with a given customer for a limited period of time before moving the code to assigning a different debit code. As long as the customer's credit with a given merchant was accounted for, the debit codes actually assigned to the customer would be interchangeable.

We claim:

1. A method for tracing expendable debit card ownership comprising:
   issuing a token by a server, the token representing a given monetary value to a specified merchant, the given monetary value expendable via reference to a debit code representing a gift card, wherein the debit code is stored on the server;
   associating the token with a first account, wherein the first account is accessible to an account user;
   dividing the given monetary value into two or more amounts, wherein the two or more amounts are expendable by two or more debit codes that represent two or more gift cards;
   issuing periodic variable authentication codes to the first account with the token, wherein referencing the most recently issued variable authentication code to the server directs the server to expend a selected amount of the given monetary value using at least one of the two or more debit codes at the discretion of the account user;
   transferring the association of the token from the first account to a second account; and publishing the transfer to a public ledger as a transfer record.

2. The method of claim 1, wherein the public ledger includes the given monetary amount.

3. The method of claim 1, wherein the transfer record is referenced by a token number.

4. The method of claim 3, wherein the public ledger is organized into blocks, each block containing a plurality of transfer records and is referenced by a height, token, or hash number.

5. The method of claim 1, wherein the publishing occurs at substantially the same time as the transferring.

6. The method of claim 1, further comprising:
   assigning one or more specific debit codes to the token.

7. A system for tracing expendable debit card value comprising:
   a server, the server enabled to store debit codes, issue tokens, and issue periodic variable authentication codes;
      wherein the tokens represent a given monetary value to a specified merchant, and the given monetary value is expendable via reference to the debit code representing a gift card, wherein the system is configured to divide the given monetary value represented by at least one of the tokens into two or more amounts, and wherein the two or more amounts are expendable by two or more debit codes that represent two or more gift cards; and
      wherein referencing the most recently issued periodic variable authentication code by an account user directs the server to expend a selected amount of the given monetary value at the discretion of the account user;
   a plurality of user accounts, the plurality of user accounts stored on the server and accessible by a plurality of users, wherein the plurality of user accounts are configured to accept the tokens issued by the server and the plurality of users have discretion to direct the server to conduct transfers of the tokens between the plurality of user accounts;
   a network communicator, the network communicator for providing the server with Internet connectivity and receiving transfer requests from the plurality of users to conduct transfers of the tokens; and
   a public ledger website, the public ledger website for receiving notice from the network communicator of transfers conducted on the server and publishing those transfers publicly.

8. The system of claim 7, wherein the network communicator is further configured to issue periodic variable authentication codes to the plurality of users guided by and corresponding to the tokens, the periodic variable authentication codes generated by the server, wherein referencing the most recently issued variable authentication code to the server directs the server to expend a selected amount of the given monetary value with the specified merchant using the debit codes.

9. The system of claim 8, wherein the public ledger website is further configured to receive notice from the network communicator of expenditures of the given monetary value by the server and publishing the expenditures of the given monetary value publicly.

10. The system of claim 7, wherein the public ledger website further organizes the published transfers into blocks, each block containing a plurality of transfers and is referenced by a height, token or hash number.

11. The method of system 7, wherein the given monetary value is the sum of two or more gift amounts expendable by two or more debit codes representing two or more gift cards.

12. The method of system 7, wherein the public ledger website further includes published charts documenting expenditure trends.

13. A method for tracing gift card debit accounts comprising:
   issuing a token by a server, the token representing a given monetary value to a specified merchant, wherein the given monetary value is expendable via reference to one or more debit codes representing one or more gift cards, and wherein the one or more debit codes are stored on the server;
   associating the token with a first account of a plurality of user accounts, wherein the first account is accessible to an account user, and the first account has a first account user;
   dividing the given monetary value into two or more amounts, wherein the two or more amounts are expendable by two or more debit codes that represent two or more gift cards;
   issuing periodic variable authentication codes to the first account, wherein referencing the most recently issued variable authentication code by the first account user to the server directs the server to expend a selected amount of the given monetary value at the discretion of the first account user;
   causing the server to transfer the selected amount of the given monetary value using the one or more debit codes at the discretion of the first account user to either the specified merchant or to a second account, thereby establishing a modified monetary amount represented by the token associated with the first account; and
   publishing the expenditure of the given monetary value and the modified monetary amount to a public ledger as an expenditure record.

14. The method of claim 13, wherein said causing the server to transfer, refers to a transfer from the first account to the second account, and the public ledger additionally publishes a balance of the second account.

15. The method of claim 13, wherein the expenditure record is referenced by a token number.

16. The method of claim 15, wherein the public ledger is organized into blocks, each block containing a plurality of expenditure records and is referenced by a height or hash number.

17. The method of claim 13, wherein the public ledger further comprises published charts documenting transfer trends that indicate an average length of time users were associated with tokens.

18. The method of claim 13, wherein said publishing occurs at substantially the same time as said causing the server to transfer.

19. The method of claim 13, further comprising:
assigning one or more specific debit codes to the token.

\* \* \* \* \*